Aug. 28, 1934.    J. A. PERRY    1,971,728
PROCESS OF REFORMING OIL GAS
Filed Feb. 27, 1929
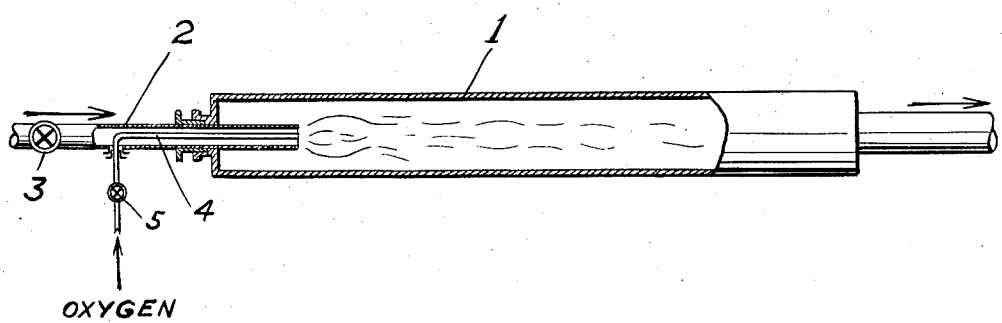
OXYGEN
WITNESS:
INVENTOR
Joseph A. Perry
BY
Augustus B. Stoughton
ATTORNEY Patented Aug. 28, 1934

1,971,728

UNITED STATES PATENT OFFICE 1,971,728

PROCESS OF REFORMING OIL GAS

Joseph A. Perry, Swarthmore, Pa., assignor to The United Gas Improvement Company, Philadelphia, Pa., a corporation of Pennsylvania Application February 27, 1929, Serial No. 343,092

2 Claims. (Cl. 48—212)

The present invention relates to the partial decomposition of high calorific power hydrocarbon gas to produce reformed gas suitable for domestic and industrial distribution.

More particularly it relates to the utilization of large quantities of by-product oil refinery gas. This gas is of high calorific power and specific gravity.

It is possible to employ by-product oil refinery gas directly for carburetting blue water gas, but the quantity that can be so employed is strictly limited due to the necessity of producing four or five times as much blue water gas as oil gas utilized, the exact amount depending on the B. t. u. standard in a particular locality.

As a rule the oil refineries do not care to sell small quantities of this gas, so that often the gas is only available to gas works in quantities which preclude its use directly for carburetting.

It is therefore desirable to decompose partially the refinery gas to reformed gas of lower calorific power and specific gravity. It is also desirable to produce a reformed gas which is replaceable in calorific power and specific gravity for other gas supplies to provide flexibility in the manipulation of gas supplies without the necessity of readjusting consumers' appliances because of excessive variations in calorific power or specific gravity.

It is the object of the present invention to provide a new method for such partial decomposition of refinery oil gas with the production of a reformed gas suitable in calorific power and specific gravity for domestic or industrial distribution.

I have found by experiment that such decomposition can be efficiently effected and a gas of the desired qualities produced by subjecting the oil refinery gas to partial combustion with oxygen.

Air or any mixed gas containing 20% or more of free oxygen may be used.

If the partial combustion is effected with air instead of oxygen, the resultant reformed gas is heavily loaded with inert nitrogen and is not suitable for distribution.

I have found that in employing oxygen the relative proportions of oil gas and oxygen may be manipulated to produce a reformed gas with but a relatively small amount of inerts (carbondioxide, nitrogen, etc.) having a specific gravity and calorific power closely approximating that of carburetted water gas, (530 B. t. u. per cu. ft.— 0.6 sp. gr.), and that the calorific power may be varied over a range of several hundred B. t. u. without appreciably increasing the quantity of carbon-dioxide formed.

For instance, the calorific power may be varied from 400 to 600 B. t. u. per cu. ft. with the $CO_2$ content remaining at approximately 5%.

In the drawing there is shown a side elevation with parts broken away of one form of apparatus in which my invention may be carried out.

Referring to the drawing there is shown the main chamber 1 which may consist of a cylindrical tube. At one end thereof is a pipe 2 having a valve 3 therein which serves to admit and control a supply of oil refinery gas. In the center of the end of pipe 2 which is enclosed in casing 1 is located a pipe 4 having therein a valve 5. Pipe 4 serves for the introduction of a stream of oxygen in the middle of the incoming stream of oil refinery gas.

As an example of oil refinery gas suitable for use in this process at an analysis of one specimen of gas which was used is given below. However, oil refinery gases vary widely in analysis and my process is capable of modification to handle them.

Oil gas analysis

|  | Per cent by volume |
|---|---|
| Illuminants | 7.5 |
| Carbon monoxide | 2.9 |
| Hydrogen | 8.4 |
| Methane | 21.6 |
| Ethane | 35.9 |
| Higher paraffins | 15.6 |
| Carbon dioxide | 1.1 |
| Oxygen | 2.6 |
| Nitrogen | 4.4 |

This gas has a calorific power of 1528 B. t. u. per cu. ft. and a specific gravity of 0.960.

Oil refinery gas having the above analysis was treated according to my process at 1400 degrees F. using 157 cu. ft. of oxygen per thousand cu. ft. of finished gas and 412 cu. ft. of oil refinery gas per thousand cu. ft. of finished gas. The finished or reformed gas resulting from this process has the following analysis:

Reformed gas analysis

|  | Per cent by volume |
|---|---|
| Illuminants | 8.1 |
| Carbon monoxide | 23.5 |
| Hydrogen | 42.0 |
| Methane | 13.6 |
| Ethane | 4.3 |
| Higher paraffins | 0.0 |
| Carbon dioxide | 2.6 |
| Oxygen | 0.4 |
| Nitrogen | 5.5 |

This reformed gas had a calorific power of 553 B. t. u. per cu. ft. and a specific gravity of 0.546. This process was carried on with a thermal efficiency of 87.7%.

I do not intend to in any way limit my process to oil refinery gas or reformed gas of the above analyses nor to any particular temperature of the reaction.

In operation, partial combustion of the oil refinery gas is established and proportions of the oil refinery gas and the oxygen so regulated that a portion of the oil refinery gas is consumed thereby partially cracking the remaining portion. The carbon released by the cracking is burned largely to carbon monoxide. Very little burns to carbon dioxide and a small amount of the hydrogen burns to water vapor. The thermal efficiency when producing a gas of 600 B. t. u. is approximately 84%.

The foregoing is merely an embodiment of my invention and I do not intend to be limited in the practice of it save by the scope of the prior art and the annexed claims.

I claim:

1. A process of reforming oil refinery gas to a commercially distributable gas having a specific gravity and calorific power closely approximating that of carburetted water gas, which process comprises, conducting oil refinery gas and substantially pure oxygen in separate streams to a reaction zone, at the reaction zone introducing said stream of oxygen to the center of said stream of oil refinery gas, burning a portion of the oil refinery gas with said oxygen in an enclosed chamber surrounding said reaction zone, and utilizing the heat of said combustion to partially crack the remaining oil refinery gas.

2. A process of reforming hydrocarbon gas to a gas having a calorific power and a specific gravity approximately equal to that of carburetted water gas, which process comprises, conducting hydrocarbon gas and a second gas containing a greater proportion of free oxygen than is contained in atmospheric air in separate streams to a reaction zone, at said reaction zone introducing said stream of second gas to the center of said stream of said hydrocarbon gas, burning a portion of said hydrocarbon gas in an enclosed chamber surrounding said reaction zone with said second gas, and utilizing the heat of said combustion to partially crack the remaining hydrocarbon gas.

JOSEPH A. PERRY.